United States Patent
Brazil et al.

(10) Patent No.: US 9,965,794 B1
(45) Date of Patent: May 8, 2018

(54) TRADE-IN PAST PURCHASE

(75) Inventors: Silas M. Brazil, Seattle, WA (US);
Ranjeet S. Sonone, Kent, WA (US);
Maurice Codik Moscoso, Seattle, WA (US); Sandeep Bodapati, Seattle, WA (US); Lisa A. Rasmussen, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1163 days.

(21) Appl. No.: 13/163,947

(22) Filed: Jun. 20, 2011

(51) Int. Cl.
*G06Q 30/00* (2012.01)
*G06Q 30/06* (2012.01)

(52) U.S. Cl.
CPC .................. *G06Q 30/0633* (2013.01)

(58) Field of Classification Search
CPC .......... G06Q 30/0601–30/0645; G06Q 30/08; G06Q 30/0278; G06Q 30/0208
USPC .............................. 705/26.1–27.2, 14.11, 306
See application file for complete search history.

(56) References Cited

U.S. PATENT DOCUMENTS

| | | | | |
|---|---|---|---|---|
| 6,684,248 | B1* | 1/2004 | Janacek | H04L 63/12 709/217 |
| 8,095,521 | B2* | 1/2012 | Chan et al. | 707/705 |
| 8,560,545 | B2* | 10/2013 | Chan et al. | 707/737 |
| 2005/0010538 | A1* | 1/2005 | Oshima | G06Q 30/06 705/80 |
| 2008/0243637 | A1* | 10/2008 | Chan et al. | 705/27 |
| 2012/0054113 | A1* | 3/2012 | Jayaraman et al. | 705/306 |
| 2012/0278197 | A1* | 11/2012 | Nguyen | 705/26.3 |

OTHER PUBLICATIONS

Ray, Saibal; Boyaci, Tamer; Aras, Necati "Optimal Prices and Trade-in Rebates for Durable, Remanufactured Products" Manufacturing & Services Operations Management, Summer 2005, p. 208-228 (Year: 2005).*

* cited by examiner

*Primary Examiner* — Matthew E Zimmerman
*Assistant Examiner* — Katherine L O'Sullivan
(74) *Attorney, Agent, or Firm* — Thomas | Horstemeyer, LLP

(57) ABSTRACT

Disclosed are various embodiments for an online trade-in store that presents recommendations or suggestions to a customer on item(s) that are currently being accepted by the store, where the recommended items are confirmed to have been previously purchased by the customer.

19 Claims, 7 Drawing Sheets

TRADE-IN PAST PURCHASE

BACKGROUND

One type of interactive electronic commerce system available to users is online trade-in stores. Accordingly, web sites have arisen that allow users to sell items, such as DVD (Digital Versatile Disc) movies, audio CDs (Compact Discs), or video games, among others. Generally, a user may visit a web site hosting the online trade-in store and search a catalog of items that the store is interested in purchasing from users. The user will typically register with the store to become a customer by entering personal information, such as the user's name, mailing address, and payment information. Once registered, the customer can then make a trade-in request. For example, if the user, after searching the catalog, finds an item listed in the catalog that is also currently owned by the user, then the user may add the item to his or her virtual shopping cart and agree to sell the item to the store. Thereafter, the customer will need to physically ship the item to the store and wait to receive confirmation that the item has been received and is in proper condition, before receiving credit or compensation for the item from an operator of the trade-in store.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of an online trade-in system and its components is provided, followed by a discussion of the operation of the same. The following discussion relates to an online trade-in store that makes recommendations or suggestions to a customer on item(s) that are currently being accepted by the store, where the recommended items are confirmed to have been previously purchased by the customer.

Figure 1:
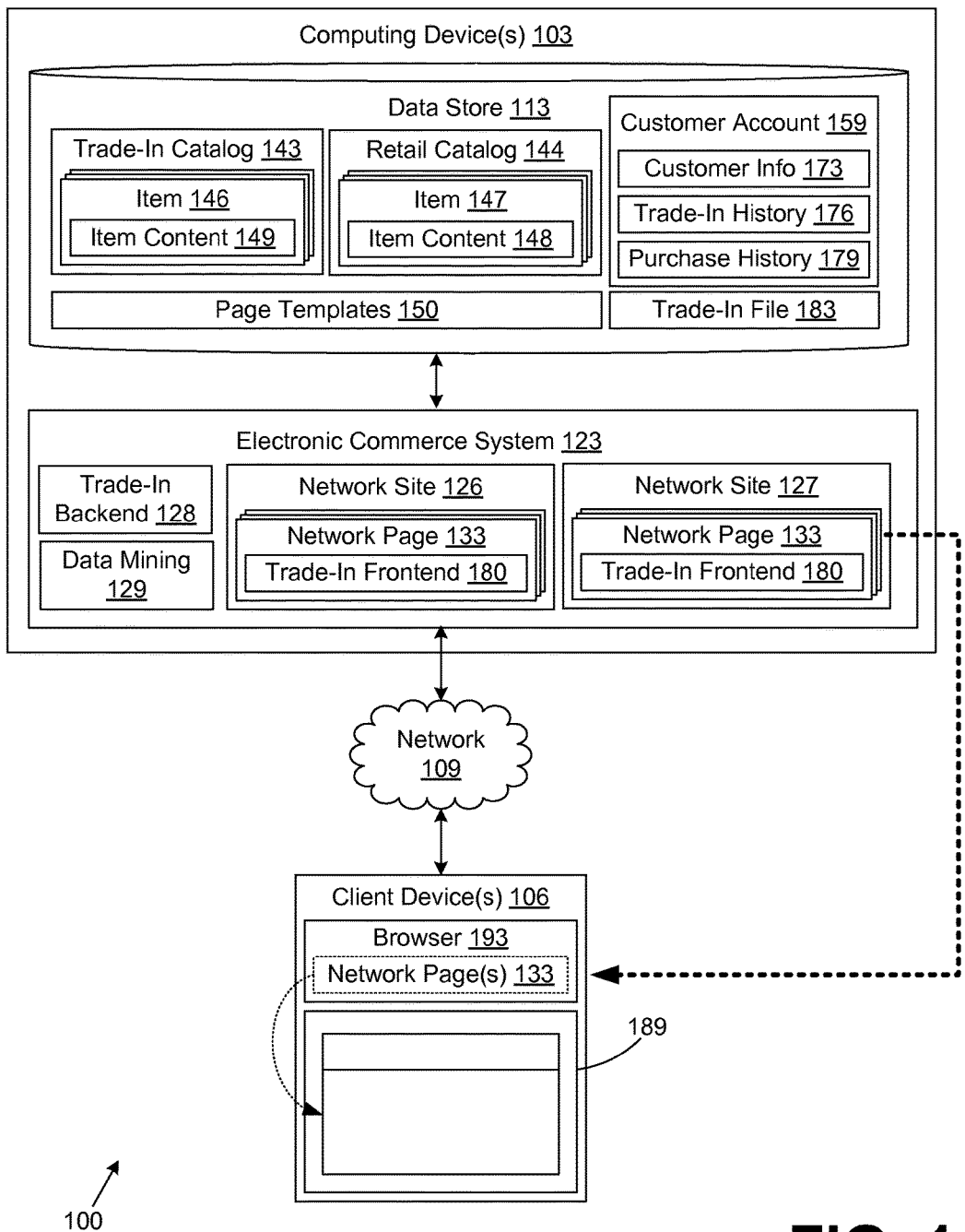
FIG. 1 is a drawing of a networked environment according to various embodiments of the present disclosure.

With reference to FIG. 1, shown is a networked environment 100 according to various embodiments. The networked environment 100 includes one or more computing devices 103 that are coupled to one or more client devices 106 through a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated, such as data store(s) dedicated to the online trade-in store and data store(s) dedicated to an online retail store. The data stored in the data store 113, for example, is associated with the operation of the various applications and/or functional entities described below.

The components executed on the computing device 103, for example, include an electronic commerce system 123 and other applications, services, processes, systems, engines, or functionality not discussed in detail herein. The electronic commerce system 123 facilitates a network site 126 such as, for example, a website or other network presence, for the online trade-in store and facilitates a network site 127 such as, for example, a website or other network presence for the online retail store. The electronic commerce system 123 includes a trade-in backend application 128, a data mining service 129, and/or other applications that are executed to generate various network pages 133 of the network sites 126, 127 and perform other functions as will be discussed. Further, a trade-in frontend application 180 is available to be embedded in network pages 133, where the trade-in frontend application 180 works in concert with the trade-in backend application 128.

The data stored in the data store 113 includes, for example, a trade-in item catalog 143 that includes a listing of items 146 being accepted for trade-in by the online trade-in store. Associated with each item 146 is item content 149 that may comprise, for example, information about an item 146 such as images, text descriptions, attributes, current pricing/values, and other information.

The data stored in the data store 113 further includes, for example, a retail item catalog 144 that includes a listing of items 147 being offered for sale by the online retail store. Associated with each item 147 is item content 148 that may comprise, for example, information about an item 147 such as images, text descriptions, attributes, and other information.

Also stored in the data store 113 are page templates 150 that are employed to generate network pages 133 used by the online retail store and/or online trade-in store. In addition, stored on the data store 113 are customer accounts 159. Each customer account 159 includes various customer data such as customer information 173, a trade-in history 176, a purchase history 179, and other information. In addition to the foregoing, there may be other data stored in the data store 113 as well.

The customer information 173 may comprise, for example, customer names, billing addresses, shipping addresses, payment instrument information, electronic mail addresses, and other information as can be appreciated. The trade-in history 176 comprises a history of the interaction of a given customer with the electronic commerce system 123 in selling items to the online trade-in store over time. The purchase history 179 sets forth the past purchases made by a given customer over time from the online retail store.

The electronic commerce system 123 is executed in order to facilitate the online purchase of items 146 over the network 109 and to facilitate the online selling of items 147 from customers over the network 109. The electronic commerce system 123 also performs various backend functions associated with the online presence of a merchant in order to facilitate the online selling of or purchase of items 146, 147, as the case may be. For example, the electronic commerce system 123 generates one or more network pages 133, such as web pages or other types of network content for the online retail store that are provided to client(s) 106 in response to various requests for the purposes of selecting items 146 for purchase, rental, download, lease, or other form of consumption. Additionally, the electronic commerce system 123 generates one or more network pages 133 for the online trade-in store, such as web pages or other types of network content that are provided to client(s) 106 in response to various requests for the purposes of selecting items 147 for trade-in.

The trade-in backend application 128 is executed as part of the electronic commerce system 123 in order to provide for the implementation of trade-in recommendations or suggestions to customers visiting the retail online store as will be described. During execution of the trade-in frontend application 180 (e.g., a widget), a trade-in data file 183 is created of a compilation or listing of eligible trade-in items to which customers have been identified as previously purchasing. The trade-in frontend application 180 or other logic may be included in respective network pages 133 of the online retail store or the online trade-in store that present the list of eligible items to customers as will be described.

A network page 133 may include code that generates dynamic network pages when executed or interpreted in the client device 106. The code may be written in any suitable programming language such as, for example, PHP (Hypertext Preprocessor), Perl, Objective C, Java, Ruby, etc. Also, the network pages 133 may also include code configured to be executed or interpreted within the client device 106 in order to facilitate dynamic rendering of the network page 133. Such code may be referred to as an executable and may be written in any suitable programming language such as, for example, Java Script, Java, or other languages.

Network pages 133 may also include static elements that may be expressed, for example, in hypertext markup language (HTML), extensible markup language (XML), and/or any other language suitable for creating network pages 133.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, a personal digital assistant, a cellular telephone, a set-top box, music players, web pads, tablet computer systems, game consoles, or other devices with like capability. The client computing device 106 includes, for example, a display device 189 such as a cathode ray tube, a liquid crystal display, or other type of display device as can be appreciated.

The client computing device 106 may be configured to execute various applications such as a browser 193 and/or other applications. The browser 193 or other client application is executed in the client computing device 106, for example, to access and render network pages 133, such as web pages, or other network content that is rendered, for example, on the display device 189. Such network pages 133 and other content are served up to the client computing device 106 by the computing device 103 and/or other servers. The client computing device 106 may be configured to execute applications beyond the browser 193 such as, for example, email applications, instant message applications, and/or other applications.

Figure 2:
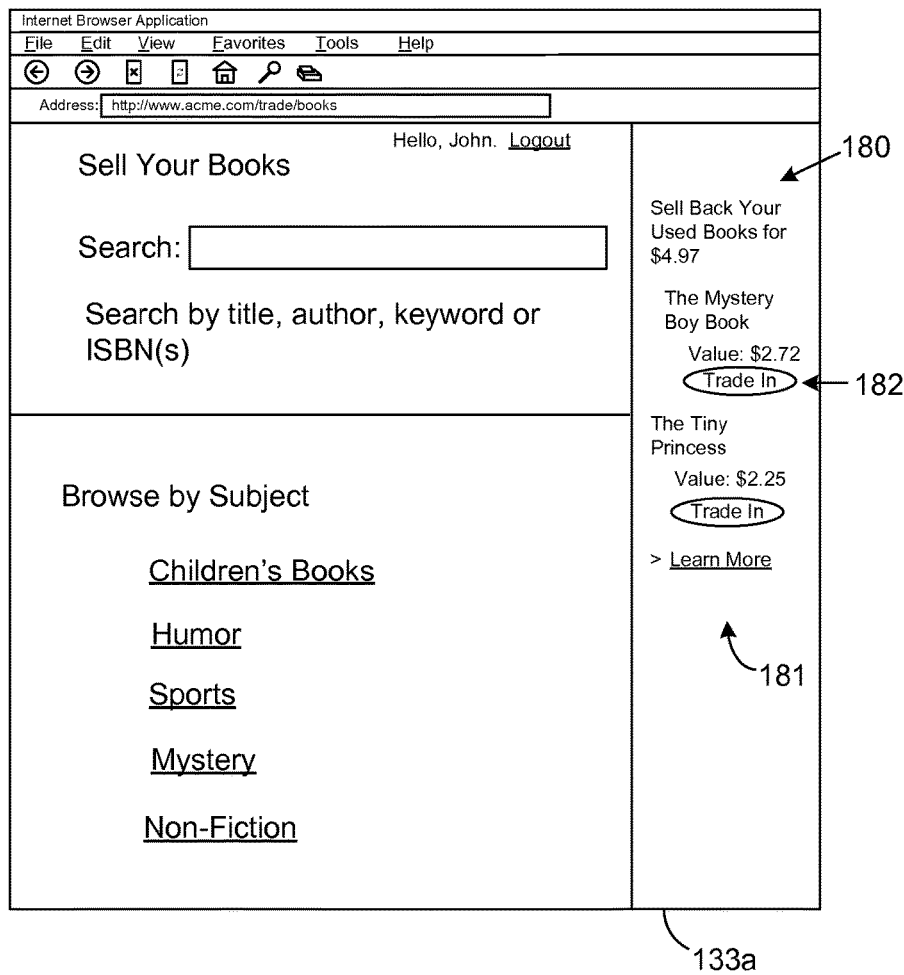
FIGS. 2-4 are drawings of exemplary network pages utilized to recommend past purchase items as trade-in items for an online retail store according to various embodiments of the present disclosure.
Figure 3:
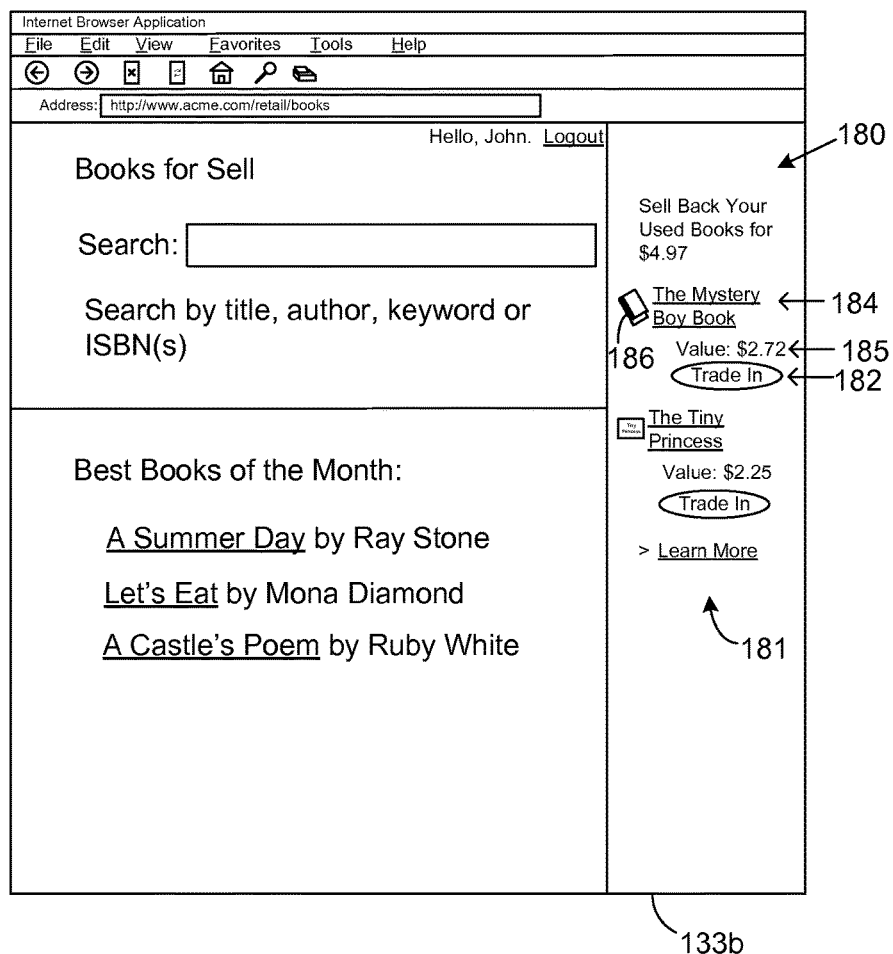

In the discussion that follows with respect to FIGS. 2-3, various graphical user interface components are described such as push buttons, text fields, and the like. It is understood that these components are merely examples of the many different types of components that may be employed to achieve the same functionality. In discussing the figures, a general description of the operation of the various components of the networked environment 100 (FIG. 1) is also provided.

Referring to FIG. 2, shown is one example of a network page 133, denoted herein as network page 133a, according to various embodiments of the present disclosure. It is noted that the electronic commerce system 123 (FIG. 1) generates and serves up the various network pages 133 that make up the network sites 126, 127 (FIG. 1). To this end, the network site 126 (FIG. 1) facilitates the trade-in of the items 146 (FIG. 1) listed in the trade-in item catalog 143 (FIG. 1). In one embodiment, the electronic system 123 (FIG. 1) may serve up a network page 133a that makes up the online trade-in store. Embedded in the network page is a copy of the trade-in frontend application 180.

In one embodiment, the trade-in frontend application 180 is a downloadable application or widget that is implemented using web technologies including JavaScript, Flash, HTML and CSS. The application 180 may be a string of software code that is embedded in a network page 133 that is downloaded by a network browser 193 (FIG. 1) of a client computing device 106 (FIG. 1) for either an online retail store or online trade-in store. The trade-in frontend application 180 provides a graphical interface 181 in which to interact with a viewer of the network page 133. The graphical interface 181 displays information and invites the viewer or user to act in a number of ways. In some embodiments, the graphical interface 181 includes text fields, buttons, dialog boxes, pop-up windows, pull-down menus, icons, scroll bars, resizable window edges, progress indicators, selection boxes, windows, tear-off menus, menu bars, toggle switches and forms.

When a customer identifies itself on the online trade-in store, such as by logging-in to a customer account with a user code or name, a customer-ID is passed to the trade-in frontend application 180. In the example shown in FIG. 2, the customer has provided a user code, has been associated with a customer-ID, and is known to the store as "John." The trade-in frontend application 180 provides identification information to the trade-in backend application 128 (FIG. 1) of the computing device 103 (FIG. 1) that determines whether the customer has a past purchase that is eligible for trade-in to the trade-in online store. If there is a past purchase that qualifies, then the trade-in backend application 128 of the computing device 103 provides the trade-in frontend application 180 the pertinent information to display the item information within the graphical interface of the trade-in frontend application 180.

In various embodiments, a customer-ID may not be linked to an individual user but may be associated with multiple users such as a user-group or family. Accordingly, purchase histories of individual users may be collected and associated with the customer-ID of the user-group or family. Therefore, trade-in item recommendations may be based on the event history of the entire user-group and not an individual member.

A customer may select an item for trade-in by selecting a push button 182 or link that will direct the item to be placed in a virtual shopping cart for the trade-in store or by taking other appropriate action and must proceed to submit a request to the online-store that the customer would like to trade-in the items in the cart for the offered price(s).

Referring now to FIG. 3, an additional process for selecting items for trade-in involves an online retail store in addition to the trade-in store. The online retail store is directed to offering product items for sale to customers. Therefore, the online retail store facilitates the online purchase of items over a network 109. For example, the online retail store features network pages such as web pages or other types of network content that are provided to clients for the purposes of selecting items for purchase, rental, download, lease, or other form of consumption as will be described.

In one embodiment, the electronic system 123 (FIG. 1) may serve up a network page 133b that makes up the online trade-in store. Embedded in the network page is a copy of the trade-in frontend application 180. The trade-in frontend application 180 provides a graphical interface 181 in which to interact with a viewer of the network page 133b. The graphical interface displays information and invites the viewer or user to act in a number of ways.

When a customer identifies itself on the online retail store, such as by logging-in to a customer account, a customer-ID is passed to trade-in frontend application 180. The trade-in frontend application 180 provides the information to the trade-in backend application 128 (FIG. 1) of the computing device 103 that determines whether the customer has a past purchase that is eligible for trade-in to the trade-in online store. If there is a past purchase that qualifies, then the computing device 103 (FIG. 1) provides the trade-in frontend application 180 the pertinent information to display the item information within the graphical interface 181 of the trade-in frontend application 180.

In one exemplary embodiment, the trade-in frontend application 180 lists vertically the items that are suggested for trade-in. In some embodiments, a picture or image 186 of the item may also be presented next to an item title 184. The title 184 may also be a hyperlink to a details page for the product. A trade-in value 185 is also present for each item and beneath the trade-in value is a button 182 that allows a user to add an item to his or her trade-in virtual shopping cart. A total value of items being suggested or offered may also be displayed. Accordingly, such processes of the trade-in applications 128, 180 may improve awareness of offerings of the trade-in store and increase volume of participation from customers.

It is noted that items that a customer is interested in possibly purchasing or renting from the online retail store may be placed in a virtual shopping cart for the online retail store, where the cart for the online retail store is distinct and different from the cart for the online trade-in store. Generally, items located in the cart for the online trade-in store are items that the customer is interested in selling and items located in the cart for the online retail store are items that the customer is interested in purchasing.

Figure 4:
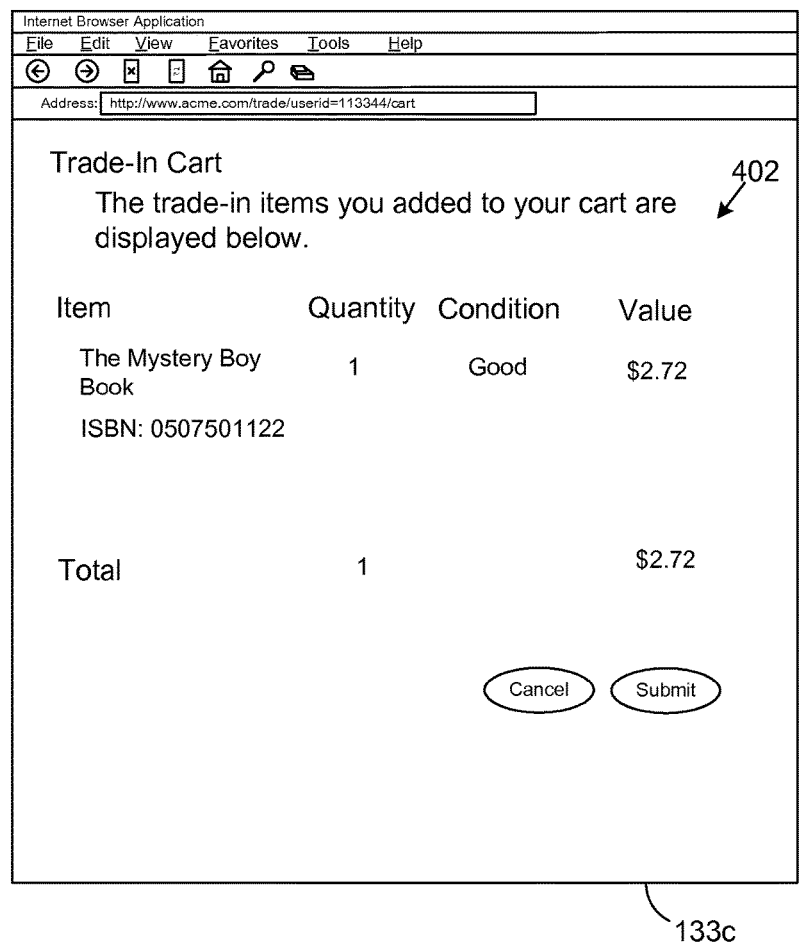

Now referring to FIG. 4, one embodiment of a virtual shopping cart for the online trade-in store is depicted. A network page 133c served by the electronic commerce system 123 (FIG. 1) features a shopping cart 402 showing items that a customer has selected for trade-in to the trade-in store. The cart 402 shows a total amount ($2.72) that the customer may receive for the trade-in, the quantity (1) of the items that the customer has selected for trade-in, and the condition of the items ("Good") that the customer has selected for the item(s), where the trade-in value is based upon the item condition.

In some embodiments, a customer may be provided with options for specifying the condition of the trade-in item(s). For example, to narrow down the trade-in value, the customer may be able to select from among different condition types, including "like new," "good," and "acceptable."

Once the customer has added all the items they want to trade into their cart 402, the customer can submit the trade-in request for all of the items to the online trade-in store. After the request is submitted, additional steps commence to handle the customer's trade-in order. For instance, in one scenario, network pages are provided directing the customer to print shipping materials (e.g., shipping label and packing slip) to be used to ship the items to a location specified by the online trade-in store. After the items have been received, inspected, and verified, a credit or compensation in the amount of the total trade-in value is deposited into the customer's account assuming that the items have been approved and accepted by the online trade-in store or a third-party merchant that is buying the items through the online-store.

In order to make trade-in recommendations, such as discussed, various embodiments of the data mining service 129 (FIG. 1) periodically analyze the purchase history 179 (FIG. 1) of customers and check the items against the trade-in catalog of items 143 (FIG. 1) eligible for being traded-in at the online trade-in store. Items belonging to customers that are determined to be trade-in eligible are recorded in a separate database or data file 183 (FIG. 1). The trade-in data file 183 (FIG. 1) may be periodically updated, such as daily, by the data mining service 129. In one embodiment, the data mining service precompiles the file 183 for the next day's use by the trade-in applications 128, 180 (FIG. 1) and replaces the previous version of the file and will be replaced by the subsequent version of the file. In some embodiments, the data file 183 may be stored in a data cache to improve the speed of responding to requests to read data items from the file 183 as opposed to reading the file directly from the data store 113 (FIG. 1).

The items that are determined to be trade-in eligible are recorded in the data file 183 possibly subject to one or more filters implemented by the data mining service 129. For example, the data mining service 129 may implement a number of filters to remove items that have been previously traded-in, gifted by a customer (indicated as a gift during checkout or were gift wrapped), etc. Further, certain types of items may be filtered out or removed from the consideration for the trade-in data file 183. For example, adult items may be removed since some users may find the items embarrassing or objectionable for one reason or the other. After being subjected to the filters, top level information about the item (e.g., title, image, price, trade-in value) are assembled together by the data mining service 129 and stored as the trade-in data file 183.

Therefore, filters provide functionality for excluding items that should not be recommended by the trade-in frontend application 180. Expiration dates may optionally be included for specifying when particular purchases or items should be effectively removed from consideration for the trade-in data file 183. As one example, a filter rule may be created that identifies purchases that should not be recommended/displayed for trade-in when the purchase date of the item does not fit with a certain window of time. Alternatively, the front-end trade-in application 180 may filter by specifying input parameters for a call that is used to restrict the items that are returned. For example, the input parameters may include, but are not limited to, item identification number, item type or category, and purchase date restraints, when the application 180 requests trade-in items to be recommended.

For further illustration, a filter rule may be set to exclude a purchase that is less than a set amount of time ago, such as less than a month ago. This type of rule may be implemented to allow a purchaser to enjoy a purchase for a reasonable amount of time before prompting the purchaser about selling the purchase. A rule may also be set to exclude a purchase that is more than a set amount of time ago. This type of rule may be implemented to exclude products that are considered too old and are not viable for resale.

Further, in some embodiments, both rules may be used to define a purchase history window that sets minimum and maximum thresholds as to an age of eligible purchases. As an example, a purchase history window may be set to filter out purchases that were made more than 12 months ago or less than 1 month ago.

In some embodiments, the purchase history window may be configurable based on which network pages 133 (FIG. 1), the trade-in frontend application 180 is placed. So, if the trade-in frontend application 180 is placed on a book storefront of the trade-in store, the purchase history window may be configured to be larger than when the trade-in frontend application 180 is placed on a network page for a videogame storefront.

To illustrate, consider that third-party merchants that sell books and are looking to purchase trade-ins of books at the online trade-in store may want to use the trade-in frontend application 180 to drum up book buy back support and will choose to target purchases made by users at the beginning of a prior school term such as four months ago. Therefore, a filter rule implementing a large purchase history window may be set for the book storefront. Whereas, a merchant looking to purchase video game trade-ins may want to target a video game purchased maybe a month ago. Therefore, a filter rule implementing a smaller purchase history window may be set for the video game storefront.

Further, exceptions to the purchase history window may also be specified. For example, within a consumer electronics department or storefront, a purchase history window may be specified generally, but an exception may be instituted where certain products are exempted within the consumer electronics department, such as a certain model of a smartphone. Accordingly, for this model of the smartphone, trade-in items may be recommended for past purchases that do not fit within the purchase history window that has been implemented for the consumer electronics department.

As mentioned above, filtering rules may be performed by the data mining service 129 and/or the trade-in frontend application or widget 180. For example, the trade-in frontend application 180 may execute a function or API (Application Programming Interface) call specifying filtering parameters, such as the certain category of items that are desired to be returned or a value indicating the maximum number of days ago that the item should have been purchased, for a particular customer (customer-ID). The parameters may also specify a maximum number of items to be returned. Accordingly, if a customer has 20 prior purchases that could be returned, the trade-in application may specify that a maximum of 5 items should be returned. In some embodiments, the items having the highest trade-in values are returned. Input parameters that may be used in calls to specify items include, but are not limited to, item identification, item type, and time restraints.

In some embodiments, in addition to or in replace of displaying trade-in recommendations on a network page 133, the trade-in applications 128, 180 may send trade-in recommendations using electronic mail, text messaging, a telephone system, or other notification medium. To this end, the information depicted in the graphical interface 181 (FIG. 2) of the trade-in frontend application 180 (FIG. 2) (e.g., a list of items that are eligible for trade-in) may also be represented within an alternative notification medium such as electronic mail. Also, during checkout or a review of a customer's virtual shopping cart, recommendations may be made on a network page 133 for possible trade-in items based on the customer's past purchase history.

Figure 5:
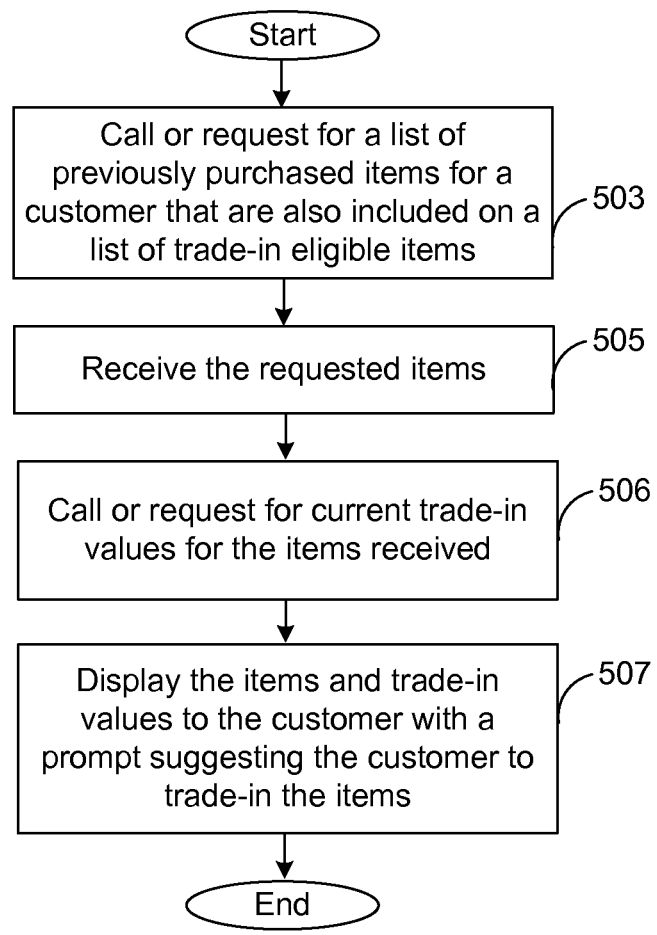
FIG. 5 is a flowchart illustrating one example of functionality implemented as portions of trade-in applications executed in a computing device in the networked environment of FIG. 1 according to various embodiments of the present disclosure.

Referring next to FIG. 5, shown is a flowchart that provides one example of the operation of a portion of the trade-in applications 128, 180 (FIG. 1) as a portion of the electronic commerce system 123 (FIG. 1) according to various embodiments. It is understood that the flowchart of FIG. 5 provides merely an example of the many different types of functional arrangements that may be employed to implement the operation of the portion of the trade-in applications 128, 180 (FIG. 1) as described herein. As an alternative, the flowchart of FIG. 5 may be viewed as depicting an example of steps of a method implemented in the computing device 103 (FIG. 1) according to one or more embodiments.

Beginning with box 503, the trade-in frontend application 180 (FIG. 1) calls for a list of previously purchased items for a customer that are also included on a list of trade-in eligible items. The trade-in frontend application 180 may make an API call to a computing device 103 (FIG. 1), specifying a customer-ID and optionally a category and maximum result parameters. In response, prior purchase items for the customer are returned from the computing device 103, in box 505, to the trade-in frontend application 180. In box 506, the trade-in frontend application 180 also calls for current trade-in values or prices 149 for the items returned and displays, in box 507, the items 146 (FIG. 1) and values 149 to the customer with a prompt for the customer to consider trading-in the items for the values shown. The prompt and the items and trade-in values may be displayed within a network page 133 of an online retail store or the online trade-in store, where the trade-in value is the amount of money or other form of credit that can be obtained as compensation for trading-in the particular item to the online trade-in store.

Figure 6:
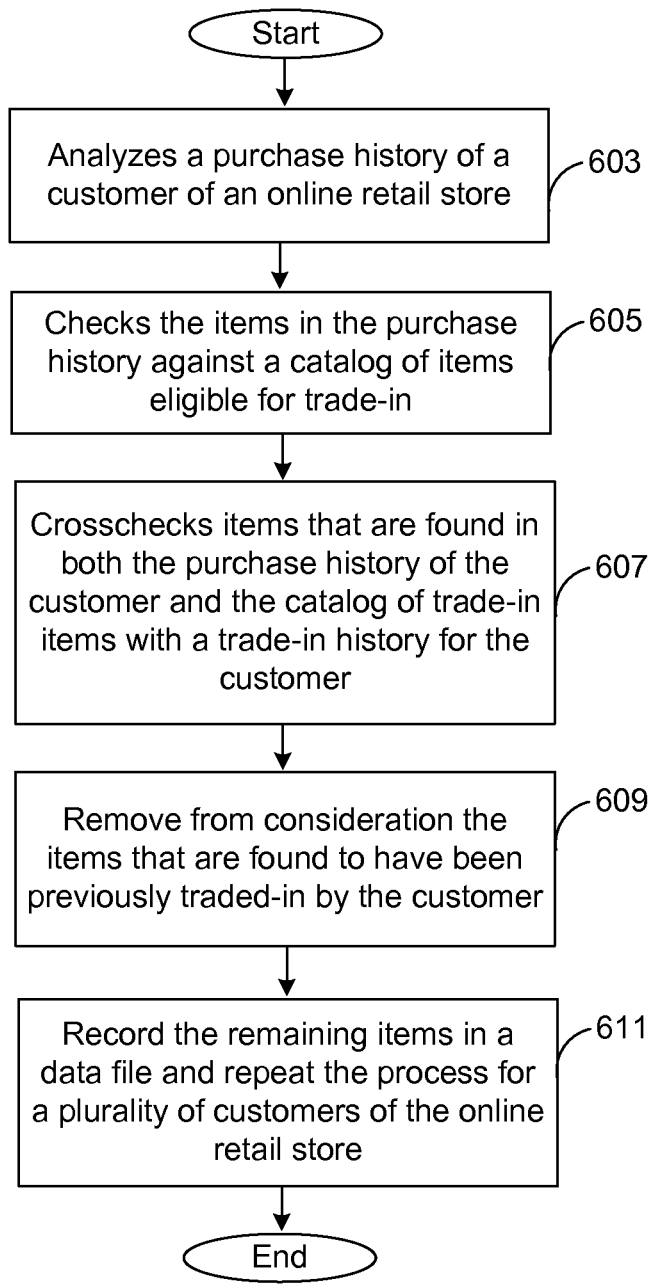
FIG. 6 is a flowchart illustrating one example of functionality implemented as portions of a data mining service executed in a computing device in the networked environment of FIG. 1 according to various embodiments of the present disclosure.

Referring next to FIG. 6, shown is a flowchart that provides one example of the operation of another portion of the data mining service 129 (FIG. 1) as a portion of the electronic commerce system 123 (FIG. 1) according to various embodiments. It is understood that the flowchart of FIG. 6 provides merely an example of the many different types of functional arrangements that may be employed to implement the operation of the portion of the data mining service 129 as described herein. As an alternative, the flowchart of FIG. 6 may be viewed as depicting an example of steps of a method implemented in the computing device 103 (FIG. 1) according to one or more embodiments.

To begin, in box 603, the data mining service 129 analyzes a purchase history 179 (FIG. 1) of a customer of an online retail store. In box 605, the service 129 checks the items in the purchase history against a catalog of items 143 (FIG. 1) eligible for trade-in at an online trade-in store. Then, in box 607, the data mining service 129 crosschecks items that are found in both the purchase history 179 of the customer and the catalog of trade-in items 143 with a trade-in history 176 (FIG. 1) for the customer. The items that are found to have been previously traded-in by the customer are removed from consideration, in box 609. Additional filters may also be used to remove other undesired items. For example, the items may be crosschecked with items that were purchased as gifts by the customer. In box 611, remaining items, after filtering, are recorded in a data file 183 (FIG. 1), and the process is repeated for a plurality of customers that may encompass each of the customers of the online retail store. The recorded items are cataloged or indexed with at least an item identification number or ID (e.g., ISBN (International Standard Book Number), product serial number, store product number, etc.), customer-ID of the customer that purchased the item, a date of purchase of the item, and a browse-node, category, or department associated with the item. However, other embodiments may have less or more information to be indexed. Via the item-ID, other item information such as title, image, trade-in value, etc. may be obtained from a data store utilized by the online retail store, trade-in store, and/or electronic commerce system 123.

Figure 7:
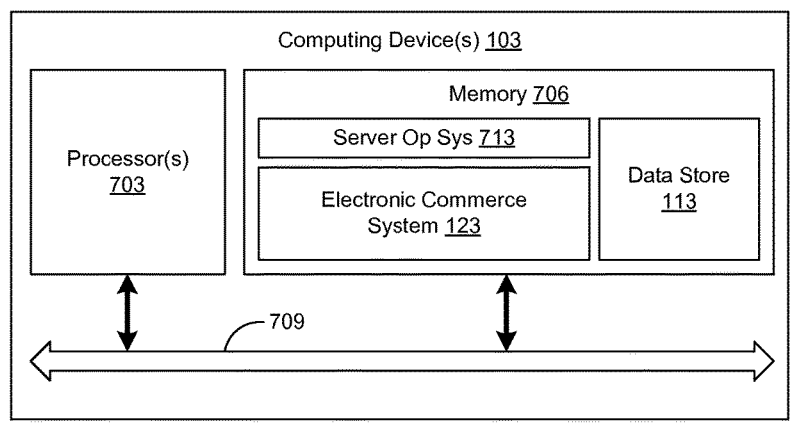
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are components of the electronic commerce system 123 which can include the electronic commerce system 123 including the trade-in applications 128, 180 (FIG. 1), data mining service 129 (FIG. 1), and potentially other applications. Also stored in the memory 706 may be a data store 113 and other data. In addition, an operating system 713 may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce system 123, including the trade-in applications 128, 180 (FIG. 1), and data mining services 129 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5 and 6 show the functionality and operation of an implementation of trade-in applications 128, 180 (FIG. 1), and data mining services 129 (FIG. 1) of portions of the electronic commerce system 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the trade-in applications and data mining service portions of the electronic commerce system 123, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing computer-executable instructions that, when executed by one or more computer systems, configure the one or more computer systems to perform operations comprising:
   receiving, by at least one network server, a customer identification code of a customer that is currently viewing a network site for an online retail store;
   retrieving, by the at least one network server, item details for at least one past purchase item associated with the customer identification code that is eligible for trade-in at an online trade-in store;
   verifying, by the at least one network server, that the at least one past purchase item was not previously traded-in by the customer; and
   presenting to a client device of the customer an offer to accept trade-in of the at least one past purchase item at a specified monetary trade-in value,
   wherein the offer contains a hypertext link to a details product network page of the online retail store corresponding to the at least one past purchase item, wherein the offer further contains a hypertext link for adding the at least one past purchase item to a virtual shopping cart of the online trade-in store.

2. The computer-readable medium of claim 1, wherein a purchase date of the at least one past purchase item is verified to have occurred after a designated first threshold date before being presented.

3. A system comprising:
   an electronic data store that stores specific computer-executable instructions; and
   at least one computing device in communication with the electronic data store, wherein the at least one computing device executes the specific computer-executable instructions to at least:
   receive a customer identification code of a customer that is currently viewing a network site;
   retrieve item details of at least one past purchase item associated with the customer identification code that is eligible for trade-in at an online trade-in store, wherein a category attributed to the at least one purchase item that is retrieved corresponds to a category attributed to a network page of the network site that is currently being viewed; and
   present to a client device of the customer an offer to trade-in the at least one past purchase item at a specified monetary trade-in value, wherein the offer is embedded on network pages of the network site attributed to the category.

4. The system of claim 3, wherein the network site comprises a site for an online retail store that offers items for sale to customers.

5. The system of claim 3, wherein the network site comprises a site for the online trade-in store that offers to provide compensation for items that are accepted as trade-ins.

6. The system of claim 3, wherein the at least one past purchase item that is retrieved is verified to not have been purchased by the customer as a gift for another person before being presented.

7. The system of claim 3, wherein the at least one past purchase item that is retrieved is verified to not have been previously traded-in by the customer before being presented.

8. The system of claim 3, wherein a purchase date of the at least one past purchase item is verified to have occurred after a designated first threshold date and before a designated second threshold date before being presented.

9. The system of claim 3, wherein the offer contains a hypertext link to a details product network page of an online retail store corresponding to the at least one past purchase item, wherein the offer further contains a second hypertext link for adding the at least one past purchase item to a virtual shopping cart of the online trade-in store.

10. A method comprising:
receiving, by a computing device, a customer identification code of a customer that is currently viewing a network site;
retrieving, by the computing device, item details of at least one past purchase item associated with the customer identification code that is eligible for trade-in at an online trade-in store;
verifying, by the computing device, that the at least one purchase item was not purchased by the customer as a gift for another person and that the at least one past purchase item was not previously traded-in by the customer; and
presenting, by the computing device, to a client device of the customer an offer to trade-in the at least one past purchase item at a specified monetary trade-in value.

11. The method of claim 10, wherein a purchase date of the at least one past purchase item is verified to have occurred after a designated first threshold date before being presented.

12. The method of claim 11, wherein a purchase date of the at least one past purchase item is verified to have occurred before a designated second threshold date before being presented.

13. The method of claim 10, wherein a category attributed to the at least one purchase item corresponds to a category attributed to a network page of the network site that is currently being viewed.

14. The method of claim 10, wherein the offer is embedded on a network page of the network site for the online trade-in store.

15. The method of claim 10, wherein the offer is embedded on a network page of the network site for an online retail store.

16. The method of claim 10, wherein the offer is embedded in an email message that is sent to the customer.

17. The method of claim 10, wherein the offer is embedded on a network page of the network site for the online trade-in store, the network page showing contents of a virtual shopping cart of the customer for the online trade-in store.

18. The method of claim 10, further comprising:
analyzing past purchases of customers of an online retail store against items currently being accepted as trade-ins at the online trade-in store; and
storing a listing of past purchase items of the customers that are eligible for trade-in at the online retail store, wherein the listing includes customer identifications of the customers whose past purchases are included in the listing.

19. The method of claim 18, wherein the listing is stored in a data cache and is periodically replaced with an updated version of the listing.

* * * * *